UNITED STATES PATENT OFFICE 2,375,616

DRILLING MUDS

Robert B. Booth, Springdale, Conn., assignor to American Cyanamid Company, New York, N. Y., a corporation of Maine No Drawing. Application December 19, 1941, Serial No. 423,603

14 Claims. (Cl. 252—8.5)

This invention relates to a method of controlling the viscosity characteristics of aqueous mud or clay dispersions of the type used in drilling oil, gas or other deep wells. Although some of the treating agents used in practicing the invention are of considerable value as preliminary viscosity reducing reagents the invention in its broader aspects is directed particularly to the problem of preventing the phenomena of thickening and rethickening in such muds, which phenomena occur as a result of conditions encountered during the drilling process.

In the drilling of oil wells and other deep wells by rotary drilling processes it is now the practice to recirculate a fluid called "drilling mud" downwardly through the hollow drill pipe, across the face of the drill bit, and upwardly through the drill hole and well casing. The drilling mud serves to cool and lubricate the drill bit, to raise the drilling cuttings to the surface of the ground and to seal the sides of the well to prevent loss of water and drilling fluids into the formation through which the drill hole is being bored. After each passage through the well the mud is usually passed through a settling tank or trough, wherein the sand and drill cuttings are separated with or without screening, after which the mud fluid is again pumped into the drill pipe by a mud pump.

Drilling muds consist of aqueous clay dispersions, with or without added materials of the types hereinafter described. The clays used in making up the aqueous dispersions are obtained from the most varied sources; in oil well drilling they are sometimes found in the well itself, at other times they are dug from deposits of clays particularly suited for the purpose, while in many cases they may be compounded from mixtures of natural clays with added gel-forming materials such as bentonite and added weighting materials such as barytes, iron oxide, magnetite or other magnetic materials in finely divided form, and the like. Frequently preliminary conditioning or viscosity reducing agents are also added to the mud such as the water-soluble salts of polyphosphoric acids and particularly the alkali metal salts such as sodium tetraphosphate and tetrasodium pyrophosphate and the water-soluble salts of metaphosphoric acid such as sodium metaphosphate, sodium hexametaphophate and the like. Sodium silicate, tannic acid, waste sulfite liquor, quebracho-soda, humic acid, lignic acid and pyrogallic acid, usually also in conjunction with free alkalies are also frequently used as preliminary conditioning agents and all or most of these materials have also been added to the mud during its subsequent use in drilling in order to maintain a reduced viscosity.

A satisfactory drilling mud must possess certain definite characteristics. It must have sufficient fluidity to permit pumping at the proper rate without excessive power requirements and must be sufficiently thixotropic in character to prevent the settling of sand and cuttings in the well when the circulation is stopped temporarily for exchanging bits, fishing for tools or for other purposes. The two most important properties of rotary drilling muds are the property of density and the property of viscosity and shearing strength, which last property is controlled by the colloidal dispersion of the mud and its graduation of particle size. Viscosity and dispersion are usually considered simultaneously with density, the problem being to obtain adequate density, low viscosity and a permanent suspension of clay solids capable of supporting sand and cuttings within the well but which will release the sand and cuttings outside the well.

The viscosity in thixotropic mud may be measured by the Marsh funnel viscosimeter and the results are expressed as the number of seconds for a given volume to flow through an orifice of predetermined size. In muds of this character the measured viscosity depends to a considerable extent on movement or on the elapsed time since movement has ceased, as one of the chief contributing factors to this viscosity is the tendency of the mud to form a gel upon standing. This property of thixotropy or gelation upon standing has been described as resulting from the presence of a shell of surface hydration surrounding each clay particle and separating it from other clay particles similarly hydrated. The normal forces of attraction between the particles are opposed by forces of repulsion existing by virtue of these shells of surface hydration, with the result that relative movement between the clay particles is hindered and the mud has a high structural viscosity.

It is a principal object of the present invention to provide a class of mud conditioning materials which have the property of delaying or inhibiting the thickening or rethickening of drilling muds. The phenomenon of thickening occurs as a characteristic rise in viscosity accompanied by considerable flocculating or gelling of the dispersed clay particles in the mud, and may result either from heating of the mud by the heat normally encountered in deep wells and by friction in pumping and recirculating, or from the action of salt or lime or other inorganic ions encountered from subterranean brines or from cement used in sealing the well, or both. Rethickening of the mud is substantially the same phenomenon as thickening, but is designated as rethickening when it occurs after the mud has originally been thinned by the addition of water-soluble polyphosphates or other conventional viscosity reducing agent. Rethickening or reflocculation of drilling muds occurs as a result of increased concentrations of treating or viscosity-reducing agents which contain metallic elements, such as the alkali metal polyphosphates and silicates referred to above, or of their decomposition products, and is also frequently encountered when quebracho is used.

I have discovered that the phenomenon of thickening and rethickening in aqueous thixotropic clay dispersions of the type used in drilling muds can be delayed and in many cases completely avoided by the incorporation therein of suitable amounts of water-soluble organic compounds of a certain well-defined class. The compounds which I have found to possess this important property are all water-soluble non-ionic nitrogen-containing organic compounds which have in the same molecule at least one acidic group and at least one —$NR_1R_2$ group, wherein $R_1$ and $R_2$ are non-ionic organic substituents which do not impair the water-solubility of the compound as a whole. In the most important mud treating agents of my invention the groups $R_1$ and $R_2$ are either hydrogen or lower alkyl radicals, although non-ionic organic radicals of higher molecular weight may be present if the compound as a whole is water-soluble. It should be noted that the term "acidic group" in the above definition means an acidic group which forms a part of the molecule of the organic compound and is not dissociated therefrom when the compound is dissolved in water, as is the case with amine salts. The most important organic compounds falling within the scope of the above definition are the water-soluble mono- and diamides of organic acids, the water-soluble amino- carboxylic acids and the water-soluble amino or amido derivatives of other compounds containing acidic groups such as phenols, aromatic nitroso compounds, sulfonated aromatic amides and the like. Many of these may be used in the form of amine salts if desired, but the anion of the amine salt does not function as a part of the compound as it is dissociated upon solution in water.

The water-soluble aliphatic acid amides which may be used to prevent thickening and rethickening in drilling muds are those of the lower aliphatic mono- and polycarboxylic acids such as formic, acetic, propionic, etc. up to and including n-caproic acid, the amide of which is moderately water-soluble. The corresponding mono- and dialkyl amides of equivalent molecular weight may also be used such as acetomethylamide, acetodimethylamide, acetoethylamide, acetodiethylamide, mixed dialkylamides such as methyl propyl acetamide, diacetamide and the like. Water-soluble amides of aliphatic di- and polyvalent acids which may be used include urea, thiourea, alkyl or aryl substituted ureas such as methyl, ethyl, propyl and butyl urea and thiourea, phenyl urea and thiourea, succinamic and methyl succinamic acids and their alkali metal and ammonium salts and the corresponding mono amides of glutaric and lower alkyl glutaric acids and their water-soluble salts. Representative water-soluble aromatic amides that may be employed are anthranilic acid and its water-soluble salts, o-amidophenol, and the like. Another important member of this class is the solubilized nigrosine described and claimed in my copending application Serial No. 385,470, filed March 27, 1941, which has now matured into Patent No. 2,318,284, granted May 4, 1943.

Another important class of nitrogen-containing organic compounds are the amides and imides of aliphatic and cycloaliphatic carboxylic acids which are solubilized by sulfonation and used in the form of their alkali metal sulfates or sulfonates. Thus, for example, the amides and imides of maleic, fumaric, itaconic, citraconic, glutaconic, aconitic and other aliphatic di- and polycarboxylic acids can be sulfonated by heating with an aqueous solution of sodium sulfite or bisulfite and thus transformed into amides and imides of sulfosuccinic, sulfoglutaric and sulfotricarballylic acids respectively. Sulfosuberic, sulfopyrotartaric and sulfoadipic acid amides and imides can be prepared by similar methods and used for controlling the viscosity of aqueous drilling muds. Similar reactions with hydroxy aliphatic polycarboxylic acid amides and imides such as malic, citric, tartaric and the like will produce the corresponding sulfates which are suitable for use, although less stable against decomposition by heat.

The water-soluble amino acids form another important class of viscosity-controlling reagents for use in drilling muds and other aqueous thixotropic clay dispersions. Simple amino-monocarboxylic acids such as glycine, glycocoll, the alanines, the leucines, valine, aminobutyric acids such as the alpha-amino compound and the like are important agents for the prevention of rethickening both when used alone and in conjunction with water-soluble polyphosphates, such as sodium tetraphosphates, tetrasodium pyrophosphate and the like as well as sodium silicate and other similar chemicals which tend to rethicken the mud upon continued addition. The corresponding alkyl and acyl substituted amino acids such as methyl glycocoll, dimethyl glycocoll, betaine, acetyl glycocoll and formyl glycocoll may also be employed as well as glycollamide and the corresponding amides of the alanines and other amino-fatty acids. Similarly the water-soluble amino-substituted aliphatic di- and polycarboxylic acids and their salts may also be used.

In my copending applications, Serial Nos. 338,241 and 338,050, filed May 31, 1940, I described and claimed the use of dicyandiamide and of urea compounds including urea, thiourea, and alkyl, alkylene and aryl substituted ureas and substituted thioureas including methyl, ethyl, propyl, butyl and higher mono- and dialkyl ureas and thioureas as viscosity controlling reagents for aqueous clay dispersions, and particularly for drilling muds. These applications have now matured into Patents No. 2,280,995 and 2,280,994, respectively, both dated April 28, 1942. The present application is a continuation-in-part of these two earlier-filed applications, by reason of the fact that the compounds described empirically as reagents for preventing rethickening in clay dispersions are members of the broad class defined above. Further investigation with other representative members of this broad class led me to a recognition of the fact that the entire class of water-soluble organic nitrogen compounds containing acidic groups is available as protective agents for preventing the thickening or rethickening of mud dispersions, and this constitutes the basis of my present application.

Although my present invention is not to be limited by any theory of action of the compounds involved, I believe that the important properties of the class in question are due at least in part to their buffering action on the clay colloids, which buffering action results from the presence of both acidic and amino or amido groups in the same organic compound. Clays forming thixotropic mud dispersions are zeolitic in character; that is to say, they contain a nucleus composed of alumina and silica and a more strongly basic portion which is usually subject to ion exchange. I believe that the adsorption of excessive amounts of strongly basic ions, such as sodium or calcium ions, is an important factor in the deterioration of drilling muds by "salt-cutting" and "lime-cutting," as well as in the rethickening of muds due to overtreatment with phosphates and other chemicals containing considerable quantities of water-soluble bases, and the thickening of mud by heat appears to be due to somewhat the same causes. Investigations of drilling muds containing relatively small amounts of nitrogen-containing organic compounds of the class defined above under conditions normally producing thickening, such as high temperatures and with added water-soluble salts have shown that these compounds are effective to delay or inhibit an excessive rise in the viscosity of the mud, and I believe that this result is due to a buffering or protective action which prevents ready accretion of excessive positive ions by the clay particles.

From the foregoing it will be seen that my present invention is directed primarily to the provision of a class of compounds that are designed to supplement the mud treating chemicals now in use, rather than to replace them. As has been noted above, a large number of water-soluble mud treating chemicals containing positive ions are now in use for this purpose, the most important being the water-soluble salts of polyphosphoric acids such as sodium tetraphosphate, tetrasodium pyrophosphate, sodium metaphosphate, sodium hexametaphosphate, sodium acid pyrophosphate, sodium silicate, quebracho, quebracho-soda, and the corresponding potassium salts. One of the most important advantages of my invention resides in the fact that the water-soluble non-ionic organic compounds containing both acidic groups and amido or amino groups may be used with success to offset the rethickening that occurs when excessive quantities of these phosphates and similar compounds are added to drilling muds.

The invention in its broader aspects is not limited by the method used in incorporating the organic nitrogen-containing compounds of the present invention with the mud or clay dispersion and any suitable method of incorporation may be used. In well drilling one method that has been employed with success is to mix a solution of the compounds, which solution may or may not contain other viscosity reducing agents as noted above, with the mud as it comes out of the well to facilitate the screening or settling out of sands and cuttings. In other cases the mud treating composition may be added just ahead of the mud pump so that the pumping operation may assure a thorough mixing. Still another method is to introduce a solution of the treating composition into mechanical de-gelling mechanisms, and other methods may be resorted to if desired. However, it should be noted that the remarkable property of the organic compounds containing both acidic and amino or amido groups in deflocculating a mud fluid that has already been thickened by heat or by inorganic salts, or that has been re-thickened by the addition of excessive amounts of other viscosity reducing agents renders this material of especial value as an addition agent to mud fluids that have already been used for some time, and in many cases the treating agents of the present invention may not be added to the mud until after the first few days of a drilling operation employing fresh drilling mud and other deflocculating agents.

The nitrogen-containing organic compounds containing both acidic and amino or amido groups may be employed in any suitable quantities, including relatively large quantities if necessary, in order to retard or offset the progressive thickening and deflocculation that frequently occurs as drilling proceeds, and they may be applied in any suitable form. Thus, for example, many of the organic compounds previously described are capable of forming salts with polyphosphoric acids such as tetraphosphoric acid, metaphosphoric acid and polypyrophosphoric acids and the incorporation of such amine salts of polyphosphoric acids, which are themselves deflocculating agents for drilling muds, constitutes another important feature of the invention. In addition to amines, other organic nitrogen compounds such as dicyandiamide will also form salts with polyphosphoric acids and may be employed in the same manner.

In ordinary drilling practice the mud conditioning agents are added in amounts less than 0.4 pound per 42 gallon barrel of mud, and quantities of 1 pound per barrel are seldom exceeded in any single treatment. However, as continuous or intermittent additions may take place over considerable periods of time it is impossible to define the proper concentration in terms of the quantities added and this must be determined in the field. It should be understood, therefore, that the present invention includes the addition to mud or clay dispersions of dicyandiamide or composition containing this material in any amounts which, in the judgment of the operator, will give the proper viscosity that may be desired for the purpose in mind.

The invention will be illustrated in greater detail by the following specific examples. It should be understood, however, that although these examples may describe in detail some of the more specific aspects of the invention they are given primarily for purposes of illustration and the invention in its broadest aspects is not limited thereto.

EXAMPLE 1

A drilling mud dispersion having a specific gravity of 1.32 was made from McKittrick clay, which is found in California and widely used in oil well drilling. Viscosity determinations were made on this clay dispersion using the Marsh funnel viscosimeter at 500/500 cc. The procedure was as follows:

A solution of 0.4 gram of the deflocculating or viscosity reducing agent in 7 cc. of water is added to 700 cc. of the mud dispersion which is then stirred for 3 minutes with a high speed mechanical agitator and 500 cc. are immediately poured through a sieve into the funnel viscosimeter. The viscosity is expressed as the number of seconds required for the funnel to discharge.

The second and third additions of the treating agent are also made as aqueous solutions of the above concentration, thus diluting the original 700 cc. of mud with about 28 cc. of water. It has been found that this is the amount of water to approximate field conditions in certain cases. In all further additions the dry reagent is used and the mixture is stirred for 5 minutes to insure a uniform incorporation.

In this manner the cumulative effect of continuous additions of the mud-treating agent is observed. The results obtained by adding dicyandiamide, urea, thiourea, and mixtures of dicyandiamide with other viscosity reducing agents is shown in the following table. In the headings of this table, and also in the tables of other examples, dicy means dicyandiamide, TSPP means anhydrous tetrasodium pyrophosphate, $Na_4P_2O_7$, and STP means anhydrous sodium tetraphosphate, $Na_6P_4O_{13}$.

EXAMPLE 2

In order to demonstrate the value of dicyandiamide and urea for thinning or deflocculating rethickened drilling muds, samples of the mud described in Example 1 were first treated with tetrasodium pyrophosphate until the viscosity was greater than the initial value. Successive additions of dicyandiamide and of urea, respectively, were then made to these samples and the resulting viscosities determined. The procedure followed was the same as that described in Example 1. The results were as follows:

| Dicyandiamide | | Urea | |
|---|---|---|---|
| Lbs./bbl. (cumulative) | Viscosity (500/500) | Lbs./bbl. (cumulative) | Vscosity (500/500) |
| Start | 69.0 | Start | 60.6 |
| 0.5 | 61.0 | 0.5 | 56.2 |
| 1.0 | 49.5 | 1.0 | 46.6 |
| 1.5 | 42.7 | 1.5 | 41.3 |
| 2.0 | 37.8 | 2.0 | 38.0 |
| 2.5 | 35.8 | 2.5 | 35.4 |
| 3.0 | 32.5 | 3.0 | 33.1 |
| 3.5 | 30.7 | 3.5 | 31.1 |

EXAMPLE 3

A mud fluid having a specific gravity of 1.35 was prepared from McKittrick clay. This dispersion contained 23.3% solids and 76.7% water by volume, the specific gravity of the solids being 2.5. Additions were based on the water content only, and are expressed as "percent added" rather than percent content after the addition. Thus, for example, 1% $NaCl=5.37$ grs. on a 700 cc. mud sample.

Sodium chloride was added to 700 cc. of the mud as a contaminant and the sample was agitated for 30 minutes. In the columns showing the effect of urea, thiourea and dicandiamide on the action of phosphates these reagents were then added and the sample was agitated 30 minutes more. The first phosphate addition was then made and the sample was agitated 5 minutes and immediately 500 cc. were poured through a screen into a Marsh funnel viscosim-

| Lbs./bbl. cumulative | Control test no reagent | Dicy | 50% dicy 50% TSPP | 75% dicy 25% STP | Urea | Thiourea | STP | TSPP |
|---|---|---|---|---|---|---|---|---|
| Start | 62.4 | 61.0 | 58.4 | 60.0 | 59.3 | 62.6 | 65.0 | 65.0 |
| 0.2 | 57.5 | 53.6 | 34.1 | 47.4 | 58.1 | 59.3 | 39.0 | 34.3 |
| 0.4 | 53.1 | 52.1 | 31.0 | 39.7 | 51.4 | 53.8 | 33.2 | 31.1 |
| 0.8 | 47.9 | 44.5 | 29.5 | 32.6 | 45.8 | 48.2 | 29.7 | 28.9 |
| 1.3 | 47.5 | 44.0 | 28.3 | 29.9 | 45.0 | 49.4 | 28.4 | 27.4 |
| 1.8 | 48.1 | 43.0 | 27.8 | 28.4 | 43.9 | 46.5 | 27.5 | 27.1 |
| 2.3 | 47.9 | 42.0 | 26.9 | 27.4 | 42.5 | 46.1 | 27.1 | 26.7 |
| 3.3 | 49.4 | 41.4 | 26.5 | 27.4 | 41.6 | 46.0 | 26.7 | 26.1 |
| 5.3 | 48.9 | 38.7 | 26.1 | 26.5 | 41.4 | 41.7 | 26.3 | 27.9 |
| 8.3 | 46.9 | 36.8 | 26.3 | 25.9 | 38.4 | 40.2 | 26.8 | 35.6 |
| 10.8 | 47.7 | 35.8 | 26.4 | 25.5 | 38.4 | 39.5 | 29.9 | 62.1 |
| 13.3 | 47.4 | 36.1 | 26.7 | 25.3 | 38.4 | 37.0 | 32.5 | 85.0 |
| 18.3 | 46.9 | 37.4 | 28.2 | 25.4 | 33.9 | 35.6 | 72.7 | |
| 23.3 | 46.4 | 39.2 | 30.1 | 25.2 | 32.4 | 32.8 | | |
| 28.3 | 46.8 | 40.0 | 36.5 | 25.3 | 31.4 | 32.1 | | |
| 33.3 | 48.5 | 42.5 | 41.7 | 25.2 | 30.6 | 31.4 | | |
| 38.3 | | | 46.4 | 25.1 | 29.5 | 30.7 | | |
| 43.3 | | | 48.0 | 25.9 | 28.9 | 30.6 | | |
| 48.3 | | | 52.0 | 25.5 | 28.5 | | | |
| 53.3 | | | | 26.4 | 27.4 | | | |
| 58.3 | | | | 26.3 | | | | |
| 63.3 | | | | 27.0 | | | | |
| 68.3 | | | | 27.8 | | | | |
| 73.3 | | | | 28.9 | | | | |
| 78.3 | | | | 30.1 | | | | |
| 83.3 | | | | 31.6 | | | | | eter. The viscosity is expressed as the number of seconds required for the funnel to discharge.

No control tests are shown in which phosphate is added to mud fluids containing 2% and 3% of NaCl but no organic nitrogen compound because the viscosity remained too high to measure, even after substantial amounts of phosphate were added.

in shale formations that give viscosity troubles in drilling operations. This mixture approached very closely a type of drilling fluid actually employed in drilling. To various samples of the drilling mud was added varying amounts of nigrosine, tetrasodium pyrophosphate (TSPP), sodium acid pyrophosphate (SAPP), and 50% mixtures of nigrosine with sodium acid pyro-

| Percent NaCl, per cent urea test with lbs./bbl. | 1% STP | 1% 20% STP | 1% 40% STP | 1% STP | 1% ° STP | 2% 10% STP | 3% ° 10% STP | 1% 10% TSPP |
|---|---|---|---|---|---|---|---|---|
| Start | | | | | | | | |
| 0.5 | 40.4 | 28.0 | 26.1 | 26.9 | 32.9 | 35.0 | 31.2 | 27.6 |
| 1.0 | 30.7 | 24.8 | 24.0 | 24.3 | 26.9 | 28.1 | 26.8 | 31.5 |
| 2.0 | 27.3 | 23.9 | 23.1 | 23.3 | 25.0 | 25.0 | 25.8 | 29.0 |
| 4.0 | 28.9 | 23.3 | 23.1 | 23.3 | 24.9 | 24.9 | 25.6 | 27.4 |
| 6.0 | 36.1 | 23.3 | 23.1 | 23.4 | 25.1 | 24.8 | 26.0 | 28.6 |
| 8.0 | 54.8 | 23.8 | 23.1 | 23.3 | 25.3 | 25.7 | | 28.2 |
| 10.0 | | 23.5 | 22.8 | 23.4 | 25.9 | 25.8 | 26.0 | 28.4 |
| 12.0 | | 23.6 | 23.1 | | 26.9 | 26.5 | | 28.4 |
| 14.0 | | 23.9 | 23.0 | 24.0 | | 28.2 | 27.0 | 26.9 |
| 18.0 | | 23.9 | 23.0 | 24.1 | | 29.0 | 28.2 | 27.5 |
| 22.0 | | 24.3 | 23.4 | | | 31.2 | 29.0 | 29.1 |
| 26.0 | | 24.6 | 23.4 | | | 33.1 | | 30.7 |
| 30.0 | | 24.6 | 23.7 | | | 35.5 | 31.0 | 31.2 |
| 34.0 | | 25.3 | 24.3 | | | 37.2 | | 34.0 |
| 38.0 | | 25.9 | 24.3 | | | | 33.0 | |
| 42.0 | | 26.8 | 24.8 | | | | | |
| 46.0 | | 28.0 | 25.3 | | | | | |
| 54.0 | | 30.0 | 26.8 | | | | | |
| 62.0 | | 32.8 | 28.2 | | | | | |
| 70.0 | | 34.8 | 29.0 | | | | | |
| 78.0 | | | 31.6 | | | | | |
| 86.0 | | | 34.0 | | | | | |
| 94.0 | | | 35.8 | | | | | |

° =20% thiourea instead of urea.
°° =6% dicyandiamide instead of urea.

EXAMPLE 4

Viscosity tests were made on 700 cc. samples of the mud of Example 3 to which 0.5 gram of $Ca(OH)_2$, equivalent to 500 parts per million of $Ca^{++}$ ions, had been added. The procedure was as described in the preceding example. The results are shown in the following table:

| Cum. test with lbs./bbl. | STP | Urea | Thiourea | 10% urea STP | 10% thiourea STP | 6% dicy STP |
|---|---|---|---|---|---|---|
| Start | | | 80.0 | 53.2 | 42.4 | 46.0 |
| 0.15 | 57.2 | | 76.0 | 38.0 | 31.3 | 34.7 |
| 0.30 | 38.3 | | 75.0 | 31.6 | 27.8 | 27.2 |
| 0.50 | 29.9 | | 74.0 | 27.8 | 26.2 | 25.6 |
| 1.0 | 27.0 | 69.9 | 71.0 | 26.0 | 25.2 | 24.8 |
| 2.0 | 26.0 | 67.8 | 68.0 | 25.3 | 24.9 | 24.6 |
| 4.0 | 25.4 | 63.2 | 64.0 | 24.8 | 24.4 | 24.4 |
| 6.0 | 25.8 | 62.1 | 59.7 | 24.3 | 24.3 | 24.2 |
| 8.0 | 27.2 | | | 24.6 | 24.5 | 24.1 |
| 10.0 | 31.6 | 54.3 | 54.5 | 24.6 | 24.4 | 24.4 |
| 12.0 | 42.9 | | | 25.1 | | |
| 14.0 | | 49.9 | 48.7 | 24.9 | 24.6 | 24.8 |
| 18.0 | | | | 25.6 | 25.5 | 25.1 |
| 22.0 | | 43.3 | | 25.8 | 27.1 | 26.7 |
| 26.0 | | | | 27.2 | | |
| 30.0 | | 37.7 | | 29.8 | 36.0 | 32.6 |
| 34.0 | | | | 31.8 | | |
| 38.0 | | 34.5 | | 34.6 | 50.8 | 47.5 |

EXAMPLE 5

A drilling mud of a specific gravity of 1.31 was prepared by mixing 4 parts by weight of Ville Platte clay and 1 part by weight of a bentonitic clay and water and allowing the mixture to hydrate by standing. The Ville Platte clay was a Louisiana clay relatively low in colloidal matter whereas the bentonitic clay used was a highly colloidal clay representative of the kind found phosphate and tetrasodium pyrophosphate. The Marsh funnel viscosity of the various mixtures was then determined with the following results:

| Lbs./bbl. reagent | Marsh funnel viscosity, seconds | | | | |
|---|---|---|---|---|---|
| | TSPP | 50% nigrosine 50% TSPP | SAPP | 50% nigrosine 50% SAPP | Nigrosine |
| None | 68+ | 60.0 | 67+ | 67+ | 66+ |
| 0.2 | 28.5 | 30.4 | 26.0 | 28.7 | 39.2 |
| 0.4 | 29.0 | 28.4 | 26.2 | 24.5 | 31.5 |
| 0.8 | 38.2 | 26.9 | | 24.5 | 27.0 |
| 1.3 | 46.0 | 26.6 | 26.5 | 24.8 | 25.5 |
| 1.8 | 62.2 | 26.2 | 28.0 | 24.8 | 25.3 |
| 2.3 | 93.0 | 25.7 | 29.4 | 25.0 | 24.8 |
| 3.3 | | 26.2 | 30.3 | 25.0 | 24.8 |
| 5.8 | | 26.2 | 34.0 | 25.5 | 26.0 |
| 10.8 | | 28.6 | 38.5 | 26.5 | 27.0 |
| 18.3 | | 68.0 | 42.5 | 30 ? | 30.2 |
| 28.3 | | | 51.0 | 32.5 | 39.0 |
| 38.3 | | | 87.0 | 37.0 | 60.5 |
| 43.3 | | | | 40.5 | 87.0 |

It is noted that the addition of small amounts of nigorsine reduces considerably the viscosity of the hydrated mud mixture and the addition may be continued over a wide range without increasing unduly the viscosity of the mud. The addition of sodium acid pyrophosphate decreases the mud viscosity almost as well as nigrosine but excessive amounts tend to rethicken the mud. A 50–50 mixture of nigrosine and sodium acid pyrophosphate is seen to be more effective as a viscosity controlling agent than either nigrosine or sodium acid pyrophosphate. Tetrasodium pyrophosphate appears to be very critical in its effect, and the addition of slightly excessive amounts raised the viscosity of this mud to a very high figure. When added to the mud with an equal proportion of nigrosine it is observed, however, that large quantities may be added without danger of rethickening.

EXAMPLE 6

A drilling mud having a specific gravity of 1.34 was made from McKittrick clay and was treated with representative water-soluble amino acids, both alone and in admixture with tetrasodium pyrophosphate. The procedure was identical with that outlined in Example 1 and the results obtained are set forth in the following table:

| Lbs./bbl. cumulative | TSPP | Glycine | 50% glycine 50% TSPP | dl-Alanine | 50% dl-Alanine 50% TSPP |
|---|---|---|---|---|---|
| Start | 59.2 | 62.5 | 59.3 | 61.5 | 61.8 |
| 0.2 | 29.8 | 60.0 | 32.4 | 56.4 | 33.0 |
| 0.4 | 28.8 | 53.5 | 29.8 | 52.7 | 28.9 |
| 0.8 | 28.0 | 46.8 | 27.9 | 45.4 | 27.6 |
| 1.3 | 27.8 | 47.2 | 27.5 | 45.8 | 27.4 |
| 1.8 | 27.2 | 46.4 | 27.8 | 45.0 | 27.7 |
| 2.3 | 27.0 | 46.3 | 28.1 | 44.0 | 27.3 |
| 3.3 | 26.8 | 45.1 | 27.5 | 43.0 | 27.2 |
| 5.8 | 27.6 | 42.3 | 27.7 | 39.4 | 27.1 |
| 8.3 | 35.4 | 39.9 | 27.5 | 36.5 | 26.8 |
| 10.8 | 99.6 | 37.7 | 27.2 | 34.9 | 26.6 |
| 13.3 | | 35.3 | 26.7 | 33.2 | 26.4 |
| 18.3 | | 32.3 | 26.3 | 30.4 | 26.6 |
| 23.3 | | 30.0 | 26.6 | 29.5 | 26.5 |
| 28.3 | | | 26.5 | | |
| 33.3 | | 28.3 | 26.5 | | 26.6 |
| 43.3 | | 27.2 | 38.1 | | 27.2 |
| 53.3 | | 26.9 | 53.7 | | |
| 63.3 | | 26.7 | 68.0 | | |
| 73.3 | | | | | |
| 83.3 | | | | | |
| 93.3 | | | | | |

EXAMPLE 7

Additional samples of the mud used in Example 6 were treated with representative amides, both alone and in admixture with tetrasodium pyrophosphate. The results are set forth in the following table:

| Lbs./bbl. cumulative | TSPP | Formamide | Acetamide | Butyramide | 50% formamide 50% TSPP | 50% acetamide 50% TSPP | 50% butyramide 50% TSPP |
|---|---|---|---|---|---|---|---|
| Start | 59.2 | 59.8 | 62.3 | 59.1 | 60.8 | 61.9 | 61.3 |
| 0.2 | 29.8 | 55.0 | 58.0 | 55.5 | 33.2 | 31.8 | 32.4 |
| 0.4 | 28.8 | 49.8 | 53.1 | 51.7 | 29.4 | 28.8 | 28.5 |
| 0.8 | 28.0 | 42.8 | 45.2 | 47.1 | 28.0 | 27.5 | 27.1 |
| 1.3 | 27.8 | 42.4 | 45.3 | 48.5 | 27.8 | 27.4 | 28.3 |
| 1.8 | 27.2 | 42.0 | 44.9 | 48.9 | 28.0 | 27.5 | 28.3 |
| 2.3 | 27.0 | 42.0 | 44.0 | 49.1 | 27.8 | 27.4 | 27.7 |
| 3.3 | 26.8 | 41.3 | 43.3 | 49.0 | 27.8 | 27.3 | 27.7 |
| 5.8 | 27.6 | 39.0 | 42.0 | 49.4 | 27.2 | 27.0 | 28.1 |
| 8.3 | 35.4 | 37.2 | 40.2 | 47.3 | 26.5 | 26.9 | 27.8 |
| 10.8 | 99.6 | 36.0 | 39.7 | 46.7 | 26.5 | 26.5 | 26.8 |
| 13.3 | | 34.8 | 37.8 | 46.6 | 26.3 | 26.0 | 26.5 |
| 18.3 | | 32.9 | 35.3 | 44.3 | 26.5 | 26.4 | 27.7 |
| 23.3 | | 31.0 | 33.5 | 43.0 | 26.8 | 27.5 | 29.8 |
| 28.3 | | | 32.3 | | | 26.4 | |
| 33.3 | | 28.6 | 31.2 | | 27.5 | 29.8 | 41.8 |
| 43.3 | | 26.7 | 29.3 | | 27.7 | 32.0 | 62.0 |
| 53.3 | | 25.4 | 28.5 | | 27.7 | 50.0 | |
| 63.3 | | 24.9 | 27.2 | | 27.3 | 40.5 | |
| 73.3 | | | | | 27.0 | 46.3 | |
| 83.3 | | | | | 27.1 | 56.3 | |
| 93.3 | | | | | | 79.0 | |

EXAMPLE 8

The effectiveness of the compounds described in Examples 6 and 7 as deflocculating agents for rethickened muds is shown in the following table. A mud having a specific gravity of 1.34 and a Marsh funnel viscosity of about 58.6 was prepared from McKittrick clay and water and samples were treated with increasing amounts of tetrasodium pyrophosphate, up to about 9 lbs. per barrel, until the mud had thinned to a viscosity of 27.6 and rethickened to viscosities of 57–65. The organic nitrogen compounds were then added in small amounts and the mud viscosities determined, the results being as follows:

*Mud rethickened with TSPP—Marsh funnel viscosities*

| Lbs./bbl. cumulative | Glycine | Formamide | Acetamide | Propionamide |
|---|---|---|---|---|
| Start | 57.0 | 62.8 | 61.8 | 60.8 |
| 0.5 | 45.8 | 55.8 | 55.3 | 56.3 |
| 1.0 | 37.7 | 49.4 | 49.9 | 51.0 |
| 1.5 | 32.7 | 45.7 | 45.5 | 53.0 |
| 2.0 | 30.3 | 42.3 | 42.3 | 51.9 |
| 2.5 | 28.5 | 39.3 | 39.8 | 52.7 |
| 3.0 | 27.5 | 37.7 | 37.7 | 49.1 |
| 3.5 | 27.0 | 36.7 | 36.0 | 45.5 |

What I claim is:

1. A method of controlling the viscosity of aqueous drilling muds which comprises incorporating therein a water-soluble organic compound corresponding to the formula $$R.CO.X$$

in which X is a member of the group consisting of hydroxyl and amido radicals and R is a member of the group consisting of hydrogen, alkyl and aminoalkyl radicals, X being an amido group when R is hydrogen or alkyl.

2. A method of treating aqueous drilling muds to avoid the condition known as thickening and rethickening which comprises incorporating therein a water-soluble non-ionic organic compound containing a carbamyl group.

3. A method of controlling the viscosity of aqueous drilling muds which comprises making continued additions thereto of a viscosity-reducing agent capable of rethickening the mud and also adding a water-soluble non-ionic organic compound containing a carbamyl group.

4. A method of treating aqueous drilling muds to avoid the conditions known as thickening and rethickening which comprises incorporating therein a water-soluble lower aliphatic carboxylic acid amide.

5. A method of controlling the viscosity of aqueous drilling muds which comprises incorporating formamide therein.

6. A method of controlling the viscosity of aqueous drilling muds which comprises incorporating therein a water-soluble amino carboxylic acid.

7. A method of controlling the viscosity of aqueous drilling muds which comprises incorporating therein a water-soluble lower aliphatic amino carboxylic acid.

8. A method of controlling the viscosity of aqueous drilling muds which comprises incorporating glycine therein.

9. A drilling fluid comprising a thixotropic aqueous clay dispersion and a water-soluble organic compound corresponding to the formula $$R.CO.X$$

in which X is a member of the group consisting of hydroxyl and amido radicals and R is a member of the group consisting of hydrogen, alkyl and aminoalkyl radicals, X being an amido group when R is hydrogen or alkyl.

10. A drilling fluid comprising a thixotropic aqueous clay dispersion and a water-soluble non-ionic organic compound containing a carbamyl group.

11. A drilling fluid comprising a thixotropic aqueous clay dispersion containing a viscosity-reducing agent capable of rethickening the fluid and also containing a water-soluble non-ionic organic compound having combined therein a carbamyl group.

12. A drilling fluid comprising a thixotropic aqueous clay dispersion and a water-soluble lower aliphatic carboxylic acid amide.

13. A drilling fluid comprising a thixotropic aqueous clay dispersion and a water-soluble amino carboxylic acid.

14. A drilling fluid comprising a thixotropic aqueous clay dispersion and a water-soluble lower aliphatic amino carboxylic acid.

ROBERT B. BOOTH.